(12) United States Patent
Lin et al.

(10) Patent No.: US 10,663,309 B2
(45) Date of Patent: May 26, 2020

(54) ROUTE PLANNING AND ADAPTATION BASED ON VEHICLE HEALTH MANAGEMENT INFORMATION

(71) Applicant: GM GLOBAL TECHNOLOGY OPERATIONS LLC, Detroit, MI (US)

(72) Inventors: Wen-Chiao Lin, Rochester Hills, MI (US); Xiaoyu Huang, Troy, MI (US); Shengbing Jiang, Rochester Hills, MI (US); Youssef A. Ghoneim, Rochester, MI (US); Chaitanya Sankavaram, Sterling Heights, MI (US); Azeem Sarwar, Rochester Hills, MI (US); Steven W. Holland, Saint Clair, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 15/680,337

(22) Filed: Aug. 18, 2017

(65) Prior Publication Data
US 2019/0056234 A1 Feb. 21, 2019

(51) Int. Cl.
*G01C 21/34* (2006.01)
*G01C 21/26* (2006.01)
*G05D 1/00* (2006.01)
*B60R 16/023* (2006.01)
*G07C 5/00* (2006.01)
*G07C 5/08* (2006.01)

(52) U.S. Cl.
CPC ....... *G01C 21/3461* (2013.01); *G01C 21/265* (2013.01); *G05D 1/0088* (2013.01); *B60R 16/0232* (2013.01); *G07C 5/006* (2013.01); *G07C 5/0808* (2013.01)

(58) Field of Classification Search
CPC .............. G01C 21/3461; G01C 21/265; G05D 1/0088; G07C 5/0808; G07C 5/006; B60R 16/0232
See application file for complete search history.

(56) References Cited

U.S. PATENT DOCUMENTS

| | | | |
|---|---|---|---|
| 2008/0168833 A1* | 7/2008 | Awad | G01M 17/02 73/146 |
| 2017/0023372 A1* | 1/2017 | Van Latum | G08G 1/202 |
| 2017/0090478 A1* | 3/2017 | Blayvas | G01C 21/3453 |
| 2018/0046182 A1* | 2/2018 | Joyce | B60W 50/0225 |

* cited by examiner

Primary Examiner — Alan D Hutchinson
(74) Attorney, Agent, or Firm — Quinn IP Law

(57) ABSTRACT

A method for planning and adapting a recommended travel route to a route destination for a vehicle having various subsystems includes identifying the route destination and receiving vehicle health management (VHM)/state of health (SOH) information for each subsystem. The vehicle with a controller programmed to execute the method is also disclosed. The method includes calculating route characteristics of candidate travel routes to the destination using the VHM information and determining, from among the candidate travel routes, travel routes for which the characteristics meet a respective threshold requirement. Thereafter, the controller executes a control action by displaying a candidate route meeting the threshold requirements. An occupant is prompted to revise the mission requirements when no candidate route exists. A default route to a designated parking location or repair depot may be displayed when none of the candidate routes meet the threshold requirements.

20 Claims, 3 Drawing Sheets

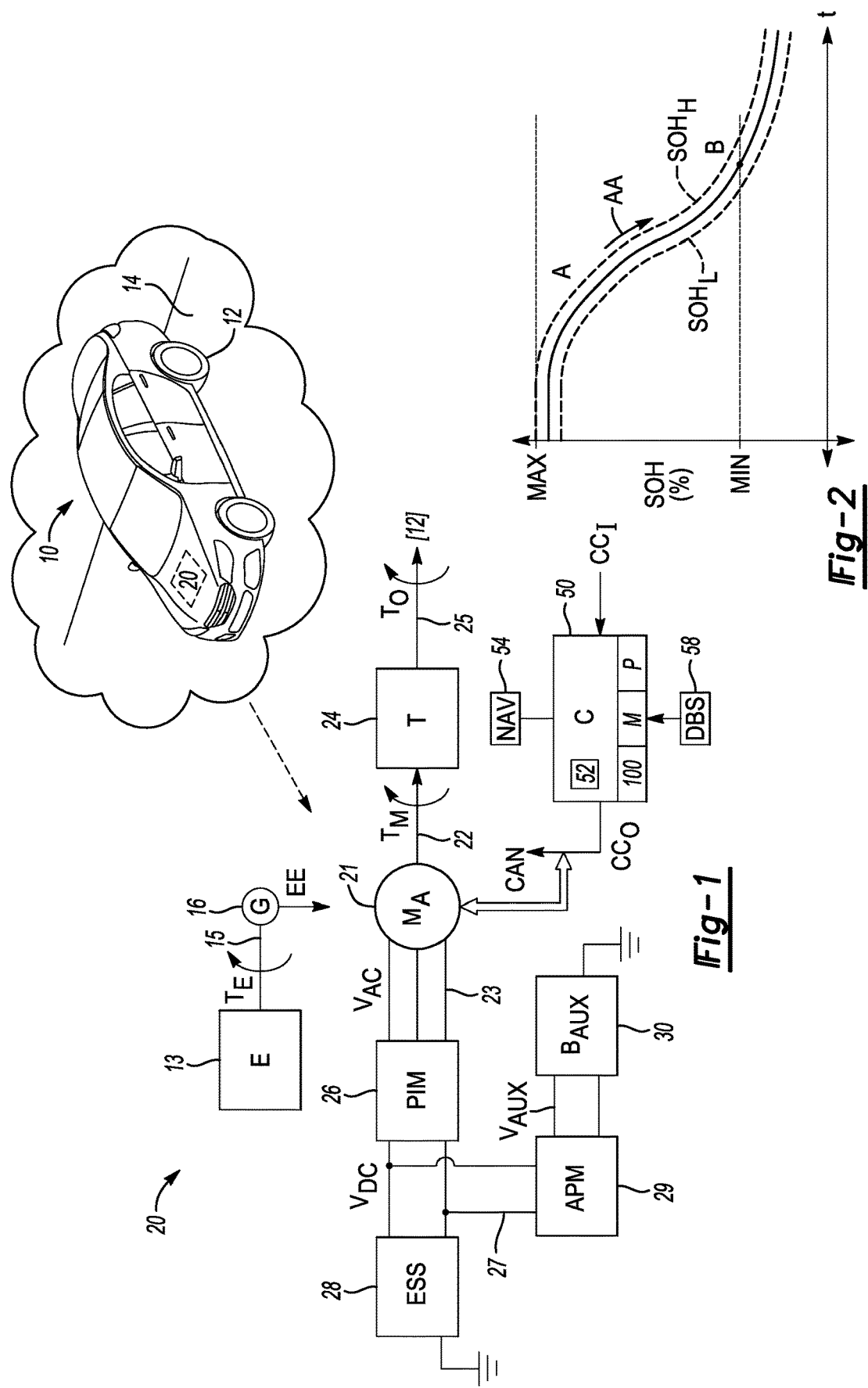

ROUTE PLANNING AND ADAPTATION BASED ON VEHICLE HEALTH MANAGEMENT INFORMATION

INTRODUCTION

Vehicle control operations require the close operational coordination of different vehicle components/subsystems, along with ongoing communication between such subsystems and their associated electronic control units. Torque generating devices, actuators, energy storage systems, sensors, cooling systems, and communications/voltage buses are examples of such vehicle subsystems. Over time, degradation of the individual subsystems affects overall vehicle drive performance.

SUMMARY

A method is disclosed herein for determining and displaying travel routes aboard a vehicle using vehicle health management (VHM) information. The vehicle may be autonomously operated (human passengers) or driver-operated (human operators) in different embodiments, and with the term "occupant" used herein to apply generally to both operators and passengers. The term "VHM information" as used herein includes a numeric state of health (SOH) of multiple subsystems of the vehicle, as well as associated diagnostic data (e.g., detected faults or past failures) and prognostic data (e.g., remaining useful life or incipient failures).

Navigation systems with touch-screen displays are commonly used to determine and present a recommended travel route in response to an operator-selected trip destination and route preference criteria such as fastest travel time or shortest distance. In addition to such criteria, the present approach incorporates available VHM information into the overall route planning and real-time adaptation of displayed travel routes, with applicability to both operator-driven and autonomous vehicles.

Age, wear, or environmental-based degradation of a vehicle subsystem affects the performance of other subsystems or the vehicle as a whole. The present approach is therefore intended to enhance satisfaction with the overall driving experience by suggesting and adapting alternative travel routes determined in part by the VHM information. That is, an occupant may wish, as a driving mission requirement, to arrive at a trip destination by a specified time. While traveling via the fastest or shortest possible route may increase the probability of satisfying the mission requirement, the stresses incurred on one or more vehicle subsystems by traveling such a route may cause the SOH of the subsystem(s) to quickly degrade, possibly to the point of requiring immediate repairs. Occupant confidence may be increased via an automated suggestion of an alternative travel route or routes as a trade-off between predetermined route criteria, such as the probability of satisfying mission requirements and stresses incurred on the vehicle subsystems. That is, a travel route may be selected that slightly lowers the probability of satisfying the stated mission requirements, but does so without incurring too much stress on the vehicle subsystem.

In particular, the present disclosure includes a method for planning and adapting a recommended travel route from the vehicle's current position or route origin to a route destination for a vehicle having multiple subsystems. An example embodiment of the method includes identifying the route destination using a controller, and then receiving, via the controller, a set of VHM information for each vehicle subsystem, with the VHM information including a numeric SOH as well as diagnostic and prognostic data as noted above. The method also includes calculating route characteristics of candidate travel routes to the route destination using the VHM information and mission criteria such as fastest travel time/closest distance or required arrival time to the destination. The controller then determines, from among the candidate travel routes, a subset (one or more) of the candidate travel routes for which the route characteristics meet a respective threshold requirement. The controller thereafter executes a control action using the determined subset. The control action may include displaying a candidate route as a recommended travel route via a display screen when a candidate route meets the threshold requirements, or recommending a default travel route, e.g., to a repair depot, when none of the candidate routes meets the threshold requirements.

Identifying the route destination may include receiving the route destination via a touch screen display device, e.g., of the controller, a navigation system, or a portable device. Receiving the VHM information may include receiving a numeric SOH of each of the vehicle subsystems in terms of a percentage or fraction of a healthy or properly functioning subsystem.

Calculating the route characteristics may include calculating a stress level of each subsystem or its constituent components as the vehicle travels to the route destination via one of the respective candidate routes and a probability of the vehicle reaching the route destination. In such an embodiment, the threshold requirement is a maximum stress level and a minimum probability.

The method may include selecting a lowest-cost candidate travel route using a cost function that includes, in some embodiments, the estimated stress level and the probability level. The cost function may be optionally embodied as $\alpha_1 S - \alpha_2 P_r$, with $\alpha_1$ and $\alpha_2$ being calibrated weights selected by the controller and S and $P_r$ being the stress level and probability, respectively.

The vehicle in some embodiments may be autonomous, with the control action aboard such a vehicle further including controlling propulsion, braking, and steering functionality of the autonomous vehicle such that the autonomous vehicle negotiates the displayed candidate route, possibly in response to occupant confirmation of the route.

A vehicle is also disclosed herein that includes a controller, a set of drive wheels powered by one or more torque generating devices, and a plurality of vehicle subsystems, including for instance actuators, control units, and sensors. The actuators include the torque generating device. The controller determines or receives the VHM information, is in communication with a display screen, and is operable for planning and adapting a recommended travel route from an origin/present position of the vehicle to a route destination using the VHM information. The controller is configured to execute the method noted above.

The above-noted and other features and advantages of the present disclosure, will be readily apparent from the following detailed description of the embodiments and best modes for carrying out the disclosure when taken in connection with the accompanying drawings and appended claims.

BRIEF DESCRIPTION OF THE DRAWINGS

FIG. 1 is a simplified schematic illustration of a vehicle and a controller programmed to execute a method for route planning and adaptation based on vehicle health management (VHM) information.

FIG. 2 is a schematic depiction of a degrading a numeric state of health (SOH) for a subsystem of the vehicle of FIG. 1, with time depicted on the horizontal axis and SOH depicted as a percentage on the vertical axis.

Figure 3:
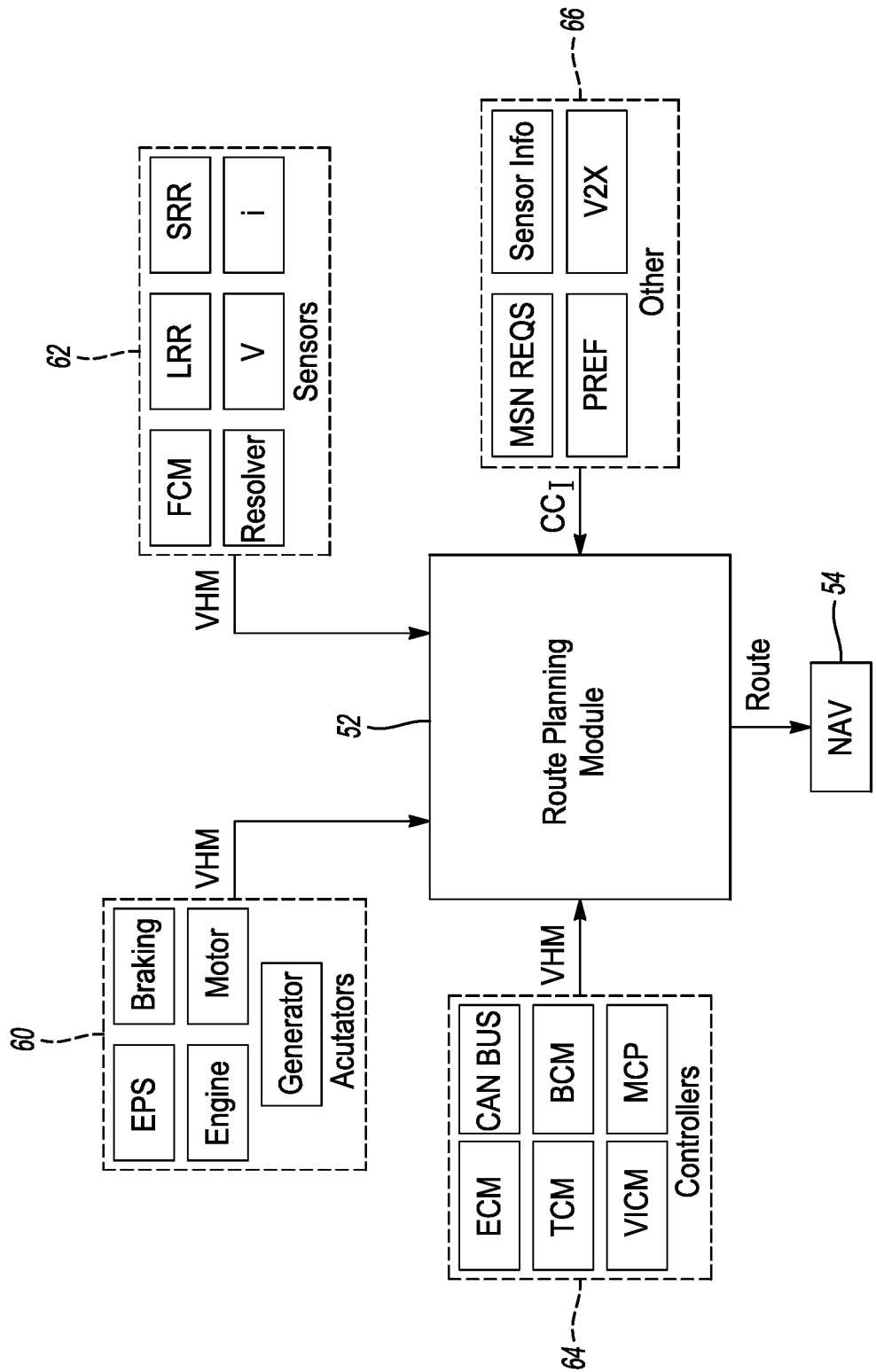
FIG. 3 is a schematic diagram depicting information flow to the controller of FIG. 1.

The present disclosure is susceptible to various modifications and alternative forms, and some representative embodiments have been shown by way of example in the drawings and will be described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to like components, a vehicle 10 is schematically depicted in FIG. 1 as a non-limiting example embodiment of a top-level system having multiple interrelated subsystems. The vehicle 10, which includes drive wheels 12 in rolling frictional contact with a road surface 14, is used hereinafter to illustrate a non-limiting type of system that lends itself to the beneficial use of the present method 100 for planning and adapting a recommended travel route for the vehicle 10 based on vehicle health management (VHM) information (arrow VHM), including prognostic and diagnostic data such as diagnostic, prognostic, and numeric state of health (SOH) of the vehicle 10 and its constituent subsystems. An example of the method 100 is explained below with particular reference to FIGS. 3-5.

The vehicle 10 in the illustrative embodiment of FIG. 1 includes a powertrain 20 having various subsystems. The vehicle subsystems may include one or more torque generating devices, shown as an example electric motor ($M_A$) 21 and an internal combustion engine (E) 13. Other embodiments of the vehicle 10 may forego use of the engine 13, or may use the engine 13 to power the drive wheels 12. Similarly, the engine 13 may be a gasoline-powered, diesel-powered, or alternative fuel-powered engine in different embodiments. Other embodiments may include a fuel cell. For illustrative consistency, the range-extending embodiment of FIG. 1 will be described hereinafter without limiting applications to such an embodiment.

The electric motor 21 delivers motor torque (arrow $T_M$) to an input member 22 of a transmission (T) 24. In turn, the transmission 24 delivers output torque (arrow $T_O$) to an output member 25 of the transmission 24 to power the drive wheels 12. The example configuration of FIG. 1 is one in which the engine 13 delivers engine torque (arrow $T_E$) via a crankshaft 15 to an electric generator (G) 16. The generator 16 then generates electricity (arrow EE) at a level that is sufficient for recharging an energy storage system (ESS) 28 and/or directly powering the electric motor 21.

The ESS 28 may be embodied as a multi-cell battery pack and associated power electronic components, e.g., circuitry and thermal management systems (not shown). The ESS 28 is connected via a direct current (DC) voltage bus 27, labeled $V_{DC}$ in FIG. 1, to a power inverter module (PIM) 26. The PIM 26, using pulse width modulation and internal switching control, inverts the DC bus voltage into an alternating current voltage ($V_{AC}$) and delivers the AC voltage to individual phase windings 23 of the electric motor 21. The DC voltage bus 27 may be connected to an auxiliary power module (APM) 29, i.e., a DC-DC voltage regulator, which reduces the high-voltage power of the DC voltage bus 27 to a lower auxiliary 12-15 VDC voltage level ($V_{AUX}$) suitable for storing in an auxiliary battery ($B_{AUX}$) 30 and/or powering low-voltage components aboard the vehicle 10.

As part of the vehicle 10, a controller (C) 50 is in communication with the various subsystems noted above and shown in FIG. 1, e.g., over a controller area network (CAN) bus, or if not in direct communication, is at least apprised of the VHM information (arrow VHM) for such subsystems, e.g., via a vehicle telematics unit. The controller 50 is equipped with requisite memory (M) and a processor (P), as well as associated hardware and software such as an oscillator, high-speed clock, and input/output circuitry. The memory (M) may include a computer-readable medium or media, including sufficient amount of read only memory (ROM), for instance magnetic or optical memory on which is recorded computer-readable instructions embodying executable portions of the method 100 described below.

The controller 50 receives the VHM information (arrow VHM) as part of or in addition to input signals (arrow $CC_I$), and in response to such signals or changes in such signals, outputs control signals (arrow $CC_O$) as part of the method 100, doing so in conjunction with a navigation system (NAV) 54 and a geospatial mapping database (DBS) 58. The navigation system 54 and the DBS 58 may be an integral part of the controller 50 in a vehicle-integrated design or may be in remote communication with the vehicle 10, e.g., via a phone or other portable device, or via a telematics unit of the controller 50. The control signals (arrow $CC_O$) are ultimately used to display a recommended travel route to an occupant of the vehicle 10 in response to execution of the method 100. The occupant may then follow the recommended route by driving the route in the typical manner, or may approve travel on the route when the vehicle 10 is an autonomous vehicle.

The controller 50 includes a route planning module 52 that is configured, alone or in conjunction with the navigation system 54, to plan, generate, and display travel routes based on vehicle health management (VHM) information, which includes a numeric state of health (SOH) of the various vehicle subsystems. The VHM information is communicated to the controller 50 via the input signals (arrow $CC_I$). For example, individual control modules 64 as shown in FIG. 3 and described below may be used for each of the vehicle subsystems noted above, such as a transmission control module (TCM), an engine control module (ECM), a body control module (BCM), a vehicle integrated control module (VICM), etc. In turn, each of the control modules may determine the numeric SOH of a corresponding subsystem, such as by calculating a value between 0 and 1 or a corresponding percentage of maximum health, with an SOH of 0 or 0% indicating a failed subsystem, an SOH of 1 or 100% indicating a properly functioning/new subsystem, and a number in between such limits corresponding to a given relative SOH as the subsystem's health degrades over its operating life.

As part of the method 100, the controller 50 may use the VHM information to determine and recommend a travel route to a designated parking location to await roadside assistance, or to a repair depot or maintenance facility when the SOH indicates an unacceptably low probability of reaching the target destination. Or, the controller 50 may determine a preferred travel route in a manner that carefully balances stress on a given subsystem against the probability or likelihood of reaching the destination. When the probability is too low or the stress is too high relative to a corresponding threshold, the controller 50 automatically seeks a new travel route to the target destination. As a default control action, the controller 50 may instead direct the vehicle 10 to a designated parking location or a repair/maintenance facility, or recommend such maintenance to the occupant via a suitable warning message or alert. As part of this approach, the controller 50 quantifies the stress and probability and then, using a cost function as set forth below in FIG. 5, selects a travel route having the minimum cost. Thus, when multiple candidate routes exist for reaching the destination within the route constraints, the controller 50 picks the one that has the least cost. When no such candidate routes exist, the controller 50 executes a default control action to alert the occupant to the SOH and recommend alternative routes to address the situation.

FIG. 2 depicts a representative subsystem of the vehicle 10 in terms of numeric SOH over time (t) as a percentage of maximum (MAX) health, 100% SOH or a numeric SOH of 1 corresponding to the highest level of possible level of health, and thus indicative of a totally healthy/new subsystem. Similarly, 0% SOH/numeric SOH of 0 corresponds to a failed subsystem. Barring a catastrophic failure, a vehicle subsystem should gradually degrade along the curve shown in FIG. 2, i.e., in the direction of arrow AA starting at point A and approaching point B. Point B corresponds to a minimum (MIN) allowable level of health, which is usually set at a level comfortably above 0% SOH, such as 20% or 30%, in order to allow limited functionality sufficient for ensuring the vehicle 10 has time to reach a designated parking location or service/repair facility when needed. The SOH of a subsystem may be an estimated value falling somewhere between a low and high value, which are labeled in FIG. 2 as $SOH_L$ and $SOH_H$, respectively.

As part of the approach disclosed herein, the controller 50 of FIG. 1 uses the reported VHM information to predict just how far the numeric SOH of a vehicle subsystem will degrade in the direction of arrow AA as the vehicle 10 travels along a given route. Certain route factors may change in transit due to changing conditions. For instance, ambient temperature may increase or a fault may manifest itself in one subsystem that ultimately affects another subsystem's SOH, e.g., a slow fluid leak or an electrical short. Weather can abruptly change, thereby causing more or less friction on the road surface 14 or affecting circulating fluids. Changing traffic conditions may require re-routing of the vehicle 10 through hillier terrain or a more circuitous route that could ultimately increase stress on certain vehicle subsystems such as brakes and steering systems and, as a result, possibly lower the probability of the vehicle 10 successfully reaching the target destination.

Information flow pertaining to communication of the VHM information for example subsystems of FIG. 1 to the route planning module 52 is depicted schematically in further detail in FIG. 3. As part of the present approach, the route planning module 52 communicates with a host of subsystems or receives the VHM information for such subsystems from a remote source, e.g., via the vehicle telematics unit of FIG. 1, with some subsystems depicted in FIG. 1 and described above. The route planning module 52 receives VHM information describing the SOH of a suite of actuators 60, such as but not limited to an electronic power steering (EPS) system, a braking system, the engine 13, the electric motor 21, or the electric generator 16. As used herein, the term "actuator" refers to a device operable for producing a linear or rotary force along the driveline of the vehicle 10 or to another vehicle component. The route planning module 52 also receives VHM information describing the SOH of sensors 62, i.e., devices that are configured to measure and report a value used in the control of the vehicle 10 of FIG. 1, such as resolvers, temperature sensors (TEMP) electrical (V, i) sensors, a front camera module (FCM), long-range radar (LRR), short-range radar (SRR), etc., with such sensors 62 arranged anywhere on the various voltage busses.

Likewise, additional controllers 64 may be used aboard the vehicle 10 as dedicated control modules for regulating operation of a given one of the subsystems whose SOH information is provided to the route planning module 52 and used to inform the route planning module 52 as part of the method 100. Such controller 64 may be prone to overheating due to the added computational load incurred when re-routing the vehicle 10 in the face of dynamically changing route factors, with the controllers 64 including for instance the ECM, TCM, BCM, and VICM noted above, or a motor control processor (MCP) of the electric machine 21. A CAN bus module may be included as part of the controller 64, with SOH information pertaining to operation of low-voltage CAN bus communications being part of the possible VHM information communicated or fed to the route planning module 52. These and other possible scenarios are possible in the example vehicle 10 of FIG. 1, and thus are illustrative and not limiting.

Also communicating with the route planning module 52 are data sources 66 such as mission requirements (MSN REQS), mapping data (MAPS) from the DBS 58 of FIG. 1, and external sensor information such as reported weather or road conditions. Preferences (PREF) of an operator of the vehicle 10 may also be provided, such as a preference for or a desire to avoid toll roads. "V2X" information, i.e., vehicle-to-X different remote sources, such as vehicle-to-vehicle (V2V) information, may also be supplied to the route planning module 52. Using the collective VHM information of FIG. 3, the route planning module 52 computes multiple candidate travel routes, analyzes such routes, and outputs a recommended travel route (arrow RTE) to the navigation system (NAV) 54 for display via the navigation system 54 or another display screen device. Depending on the configuration of the vehicle 10, a human driver may follow the recommended route or, in an autonomous embodiment, may approve or confirm the route, with the vehicle 10 thereafter self-controlling operations to travel the route. Thus, VHM information, including reported diagnostic, prognostic and SOH information of the various actuators 60, sensors 62, and controllers 64, and the data sources 66 providing miscellaneous additional information to the route planning module 52, whether calculated in the indicated modules, other modules, or offboard, are included in the present route planning process.

Figure 4:
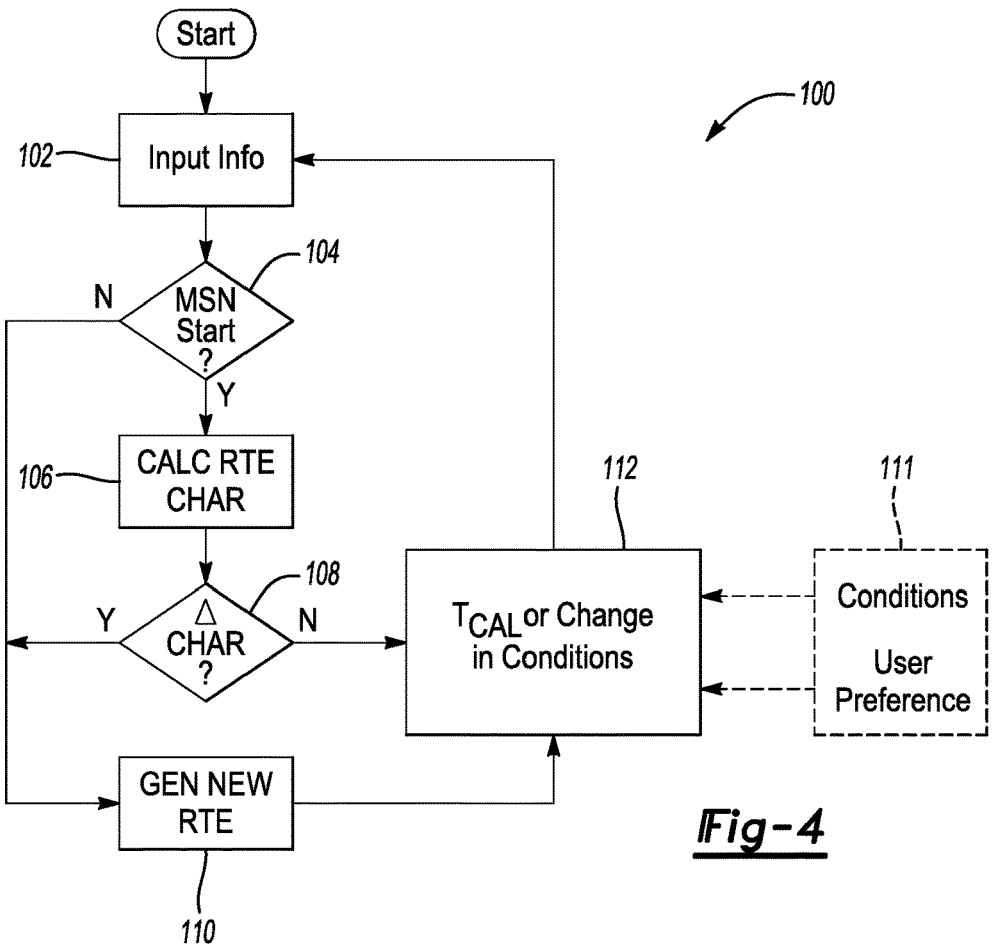
FIGS. 4 and 5 are flow charts describing an embodiment of an example method for route planning and adaptation using VHM information aboard the vehicle of FIG. 1.

Referring to FIG. 4, an example embodiment of the method 100 enables planning and adapting of a recommended travel route from a route origin to a route destination of the vehicle 10 of FIG. 1 or other vehicles having a plurality of subsystems. In general, the method 100 includes identifying the route destination using the controller 50 and receiving, via the controller 50, a set of VHM information as shown in FIG. 3 for each of the subsystems of the vehicle 10. Moreover, the method 100 includes calculating a set of route characteristics of one or more candidate travel routes to the route destination using the VHM information, and thereafter determining, from among the candidate travel routes, a subset of the candidate travel routes for which the route characteristics meet a respective threshold requirement.

As part of the method 100, the controller 50 is programmed to execute a control action using the determined subset of candidate routes. This may include displaying a selected one of the candidate routes via the display screen for a driver to comply with or the vehicle 10 to autonomously follow when the selected candidate route meets the threshold requirements. When no candidate route meets the threshold requirements, the method 100 may include recommending a default travel route or action such as a less aggressive travel route in terms of hilliness or curviness, a shorter route that terminates prior to an SOH of the vehicle subsystem degrading below an allowable threshold, a trip to a designated parking space to await roadside assistance, or to a maintenance or repair depot.

An example of such a method 100 as shown in FIG. 4 begins after initialization (START) at block 102 wherein the controller 50 of FIG. 1 gathers input information for route generation. Block 102 includes receiving the VHM information, including a numeric SOH of each of the subsystems of the vehicle 10 in terms of a percentage or fraction of a fully healthy or properly functioning subsystem. Block 102 may also include receiving a route destination, e.g., as a touch input to a touch screen of the navigation system 54 or the controller 50, and geospatial mapping information from the DBS 58 describing such route factors as topography, traffic, average route speed, etc. Candidate travel routes from the current position of the vehicle 10 to the route destination, i.e., routes that could possibly be followed unless excluded by constraints based on VHM information, may be initially determined using standard user preferences such as shortest travel distance or fastest transit time.

Block 102 may also be informed by other information. For instance, blocks 111 and 112 described below may modify the initial data processed by the controller 50 at block 102. The method 100 then proceeds from block 102 to block 104.

At block 111, the controller 50 considers triggering conditions such as changes to weather, traffic, and/or VHM or SOH information, and user preferences. Such data may be embodied as the input signals (arrow $CC_I$) of FIG. 1. Block 111 may also consider demonstrated driving behavior or history to detect a preference for a different route and/or a change to a timeframe for reaching a trip destination. The method 100 then proceeds to block 112 after collecting such dynamically changing information.

Block 112 may entail executing a predetermined delay via the controller 50 and waiting through a calibrated interval ($T_{CAL}$) to allow time to determine if the considered triggering information and user preferences from block 111 are such that adjustment to the information at block 111 is required. For example, the delay may be sufficient to consider how often a route should be adapted by the controller 50 based on changing information at block 111, or to process events such as the vehicle 10 hitting a pothole or sudden weather changes. The method 100 then proceeds to block 102.

At block 104, which is reached upon completion of block 102, the controller 50 determines whether a drive mission or trip from the present position of the vehicle 10 to a target destination or destinations has commenced, such as by processing changing coordinates of the vehicle 10 and comparing the same to coordinates of a displayed route. The method 100 proceeds to block 106 when the drive mission has commenced, and to block 110 in the alternative when the drive mission has not yet started.

At block 106, the controller 50 next calculates VHM-based drive route characteristics based on the various inputs gathered at blocks 102 and 111. For instance, the controller 50 may estimate updated route characteristics, e.g., stress on the subsystem and probability of the vehicle 10 reaching the target destination, given the changes in information from block 111, and/or given that $T_{CAL}$ has elapsed in block 112. That is, using the pothole and weather examples noted above, block 106 may determine the stress and probability given that the vehicle 10 has encountered a pothole or a sudden weather change.

In keeping with the two possible route characteristics of subsystem stress and the probability of the vehicle 10 reaching the target destination, stress may be a function of parameters of the particular subsystem, e.g., temperature, current, and duty cycle of an electric motor, or speed and temperature of a fluid pump, which provides a predictive stress on the subsystem(s) over a candidate route. Probability of completing the drive mission may be model-based or estimated value based on the present numeric SOH of the various subsystems of the vehicle 10, the rate of change of the SOH over the travel route, distance to the trip destination, and other factors such as temperature, road grade, traffic, etc. Once the VHM-based route characteristics are determined, the method 100 proceeds from block 106 to block 108.

Block 108 includes determining if the updated route characteristics of the current route, e.g., stress and probability, substantially change given the updated information from block 111, or a given time ($T_{CAL}$) has elapsed. The method 100 returns to block 112 when the VHM-based route characteristics do not change or change slightly in a manner that does not require recalculation of a recommend travel route. Block 110 is executed in the alternative when the VHM-based route characteristics change when the vehicle 10 is in transit.

At block 110, the controller 50 automatically generates a new/updated travel route using the updated information and then returns to block 112.

Figure 5:
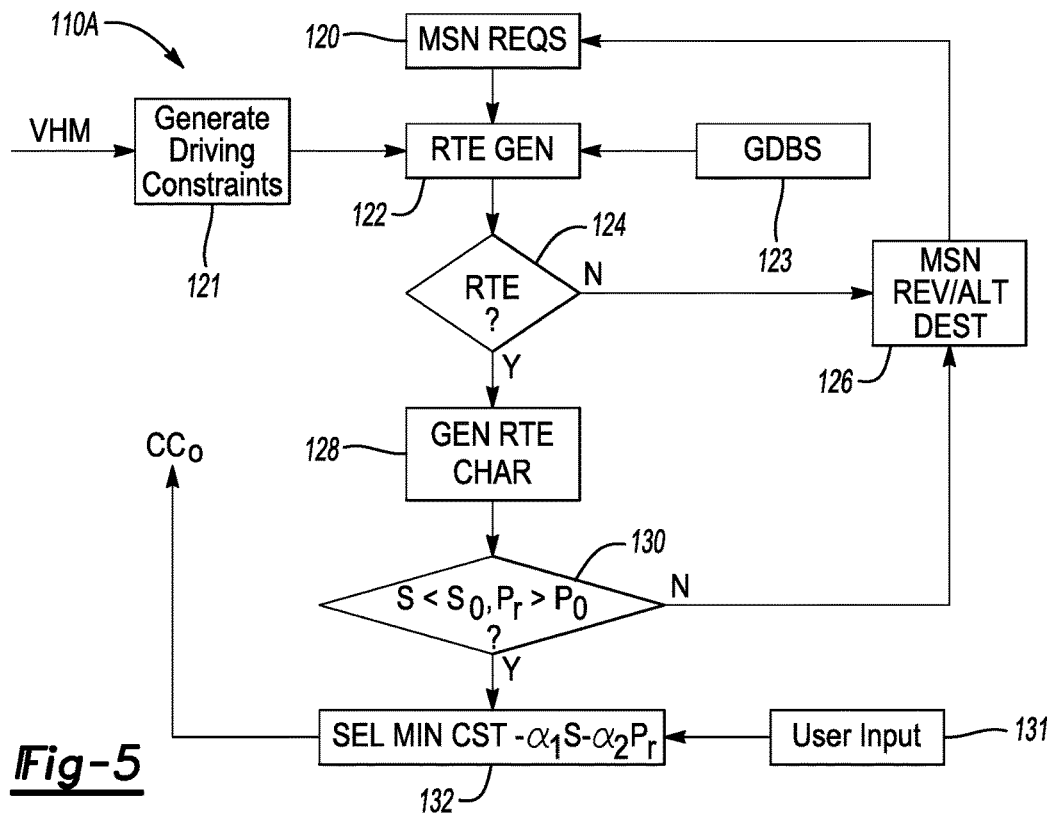

Block 110 is described in greater detail with reference to an example sub-process 110A of FIG. 5. Sub-process 110A provides driving constraints that limit more aggressive driving behavior in the event a subsystem of the vehicle 10 is determined to have a degraded SOH.

Block 120 of sub-process 110A includes determining mission requirements, e.g., in terms of current position, trip destination, and passenger preferences, using information described above with reference to blocks 102 and 111. The sub-process 110A then proceeds to block 122.

As part of the disclosed approach, the controller 50 may use availability of the vehicle 10 as part of the mission requirements of block 120. For example, an operator may populate a calendar within or made available to the controller 50 that informs the controller 50 of times and dates on which the vehicle 10 will be available for maintenance. Thus, if routes are required that would direct the vehicle 10 to a maintenance facility, for instance, this can be restricted to times at which such maintenance would be acceptable to the operator of the vehicle 10. In an autonomous application, such an option may result in the vehicle 10 automatically following the recommended travel route to the facility when the vehicle 10 is available for service, by automatically controlling propulsion, braking, and steering functionality of the vehicle 10.

At block 121, the controller 50 receives the VHM information and generates driving constraints that limit aggressive behavior of the vehicle 10 in case a vehicle subsystem is determined to have degraded SOH. For instance, if a braking system is degraded below a threshold SOH level, the controller 50 may limit vehicle speed, or may direct the vehicle 10 over a travel route that is relatively flat. Similarly, if a steering motor is degrading, the controller 50 may determine not to generate travel routes that would place the vehicle 10 on twisting roads. Constraints at block 121 are therefore appropriate for the subsystem whose numeric SOH is determined to have degraded below an SOH threshold, or whose trajectory of degradation would see the subsystem crossing below such a threshold before the vehicle 10 reaches its target destination. The sub-process 110A then proceeds to block 122.

Block 122 includes generating a travel route via the controller 50, which in turn may include receiving geospatial mapping data from the DBS 58 of FIG. 1 at block 123. Thus, block 122 is informed by blocks 120, 121, and 123 as shown. The sub-process 110A thereafter proceeds to block 124.

At block 124 the controller 50 next determines whether one or more candidate travel routes are available given the VHM-based/SOH-based constraints of block 121. The sub-process 110A proceeds to block 126 when a candidate route does not exist. Otherwise, the sub-process 110A proceeds to block 128.

Block 126 may include prompting an occupant of the vehicle 10 to revise the mission requirements, e.g., change the trip destination or modify a required time/distance requirement and thereby provide less stringent preferences. In some embodiments block 126 may include automatically selecting an alternative destination, such as routing the vehicle 10 to a designated parking location or a repair facility. The sub-process 110A then repeats block 120.

Block 128 includes generating VHM-based route characteristics as noted above with reference to block 110 of FIG. 4. VHM-based route characteristics may include stress (S) to a given subsystem and probability (P) of successfully completing the drive mission. The sub-process 110A then proceeds to block 130.

At block 130, the controller 50 of FIG. 1 next determines if driving routes exist within predefined boundaries for the VHM-based route characteristics noted above, i.e., $S<S_0$ and $P_r>P_0$, with $S_0$ and $P_0$ corresponding to stress and probability thresholds, respectively. The sub-process 110A returns to block 126 when no such driving routes are present amongst the various candidate routes. If at least one driving route meeting the criteria exist, the sub-process 110A proceeds instead to block 132.

Block 132 includes selecting, from a set of candidate driving routes determined at block 130, a driving route having a least-penalized cost, with cost (CST) possibly defined according to a defined relationship such as $\alpha_1 S - \alpha_2 P_r$. Here, the variables $\alpha_1$ and $\alpha_2$ are calibrated weights that the controller 50 may apply, e.g., from a lookup table. Block 132 may be fed by a user input block 131 possibly providing additional route selection criteria, with subjective or variable qualities such as preferred drive comfort, a preference for routes with scenic views, etc.

Thereafter, block 132 outputs a control signal (arrow $CC_O$) to the navigation system 54 of FIG. 1 or a display screen thereof to display the generated travel route meeting the least cost criteria. Thus, a control action executed by the controller 50 as a result of sub-process 110A may be the generation and display of a least-cost route based on VHM information. The calculated travel routes are thus available for a human driver to follow, or for an autonomous vehicle 10 to execute, e.g., subject to occupant approval or route confirmation.

When the vehicle 10 is an autonomous vehicle, a possible control action may include automatically controlling operation of the vehicle 10, i.e., propulsion, braking, and steering functionality, such that the vehicle 10 autonomously negotiates the displayed route. Such an option may be overridden by a passenger/occupant of the autonomous vehicle 10 in some embodiments, such as via an override signal triggered by a touch input to the navigation system 54 of FIG. 1 or a portable device.

In this manner, the controller 50 of FIG. 1 is able to plan a travel route based on available VHM information, particularly SOH information as determined by existing diagnostic/prognostic algorithms running on the controller 50 or other devices. The controller 50 is able to automatically adapt displayed travel routes in real time after a calibrated duration has elapsed or in response to detecting changes in the input signals (arrow $CC_I$). Suggested routes in operator-driven or autonomous vehicles are thus based on a balance between probability of mission completion and stress to the subsystems. If the probability is too low or the stress is too high, then the controller 50 determines whether another route can be selected, or the vehicle 10 can be brought to a default location or a repair depot.

The present approach also considers subsystems regardless of construction and function, including torque or force actuators, sensors, ECUs, communications busses, and electrical switches or hardware to find the most cost-effective travel route in terms of minimizing stress on the subsystems while maximizing the likelihood of the vehicle 10 reaching its target destination. As an ancillary result, route selection based on VHM information may be used to minimize stress on degrading subsystems and thus help extend the useful life of such subsystems.

The detailed description and the drawings or figures are supportive and descriptive of the disclosure, but the inventive scope is defined solely by the claims. While some of the best modes and other embodiments for carrying out the disclosure have been described in detail herein, various alternative designs and embodiments exist within the intended scope of this disclosure. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for planning and adapting a recommended travel route to a route destination for a vehicle having a plurality of subsystems, the method comprising:

identifying mission requirements, including the route destination, using a controller;

receiving, via the controller, a set of vehicle health management (VHM) information for each of the subsystems, the VHM information including a numeric state of health (SOH);

calculating a set of route characteristics of multiple candidate travel routes to the route destination using the VHM information;

determining, using the candidate travel routes, whether a travel route exists for which the route characteristics meet a respective threshold requirement; and executing a control action aboard the vehicle, including displaying a recommended travel route meeting the respective threshold requirement when at least one of the candidate travel routes meets the threshold requirement, and prompting an occupant of the vehicle to revise the mission requirements when none of the candidate travel routes meet the threshold requirement.

2. The method of claim 1, further comprising: displaying a default travel route to a designated parking location or a repair facility when none of the candidate travel routes using the revised mission requirements meet the threshold requirement.

3. The method of claim 1, wherein identifying the route destination includes receiving the route destination via a touch screen display device of the controller or a navigation system.

4. The method of claim 1, wherein receiving the VHM information includes receiving the numeric SOH of each of the subsystems as a percentage or fraction of a healthy or properly functioning subsystem.

5. The method of claim 1, wherein calculating a set of route characteristics includes estimating a stress level imposed on each of the subsystems if the vehicle were to travel to the route destination via the respective candidate travel routes and calculating a probability of the vehicle reaching the route destination via each of the candidate travel routes.

6. The method of claim 5, wherein the threshold requirement is a maximum stress level and a minimum probability of the vehicle reaching the route destination.

7. The method of claim 6, further comprising: selecting a lowest-cost of one of the candidate travel routes using a cost function that includes the maximum stress level and the minimum probability, wherein displaying the recommended travel route includes displaying the selected lowest-cost candidate travel route.

8. The method of claim 7, wherein the cost function is $\alpha_1 S - \alpha_2 P_r$, with $\alpha_1$ and $\alpha_2$ being calibrated weights selected by the controller and S and $P_r$ being the maximum stress level and the minimum probability, respectively.

9. The method of claim 1, wherein the vehicle is an autonomous vehicle, and wherein executing a control action aboard the vehicle further includes controlling propulsion, braking, and steering functionality of the autonomous vehicle such that the autonomous vehicle autonomously negotiates the displayed recommended travel route.

10. The method of claim 1, wherein the plurality of subsystems includes actuators, control units other than the controller, and sensors of the vehicle.

11. The method of claim 1, further comprising: automatically adapting the displayed recommended travel route via the controller after a calibrated duration has elapsed or a change in input signals has been detected.

12. A vehicle comprising:
a set of drive wheels powered by one or more torque generating devices;
a plurality of subsystems, including actuators, control units, and sensors, the actuators including the one or more torque generating devices;
a display screen; and
a controller configured to plan and adapt a recommended travel route to a route destination in response to input signals and vehicle health management (VHM) information, wherein the controller is configured to:
identify mission requirements including the route destination;
receive the input signals and the VHM information for each of the subsystems, including a numeric state of health (SOH) of each of the subsystems;
calculate a set of route characteristics of candidate travel routes to the route destination using the received input signals and the VHM information;
determine, from among the candidate travel routes, a subset of the candidate travel routes for which the route characteristics meet a respective threshold requirement; and
execute a control action aboard the vehicle using the determined subset of the candidate travel routes, including displaying, via the display screen, one of the candidate travel routes meeting the threshold requirement when at least one of the candidate travel routes meet the threshold requirement and prompting an occupant of the vehicle to revise the mission requirements when none of the candidate travel routes meet the threshold requirement.

13. The vehicle of claim 12, wherein the controller is configured to identify the route destination by receiving the route destination via a touch input to a touch screen.

14. The vehicle of claim 12, wherein the VHM information includes the numeric SOH of each of the subsystems in terms of a percentage or fraction of a healthy or properly functioning subsystem.

15. The vehicle of claim 12, wherein the controller is configured to calculate the route characteristics by estimating a stress level on each of the subsystems as the vehicle travels to the route destination via each of the respective candidate travel routes and a probability of the vehicle reaching the route destination via each of the candidate travel routes.

16. The vehicle of claim 15, wherein the threshold requirement is a maximum stress level and a minimum probability of the vehicle reaching the route destination.

17. The vehicle of claim 16, wherein the controller is further configured to select a lowest-cost of one of the candidate travel routes using a cost function that includes the maximum stress level and the minimum probability.

18. The vehicle of claim 17, wherein the cost function is $\alpha_1 S - \alpha_2 P_r$, with $\alpha_1$ and $\alpha_2$ being calibrated weights selectable by the controller and S and $P_r$ being the maximum stress level and the minimum probability, respectively.

19. The vehicle of claim 12, wherein the vehicle is an autonomous vehicle, and wherein the controller is configured to execute the control action by controlling propulsion, braking, and steering functionality of the autonomous vehicle such that the autonomous vehicle autonomously negotiates the displayed candidate travel route.

20. The vehicle of claim 12, wherein the controller is configured to automatically adapt the displayed candidate travel route after a calibrated duration has elapsed or a change in the input signals is detected.

* * * * *